United States Patent
Alnafoosi et al.

(10) Patent No.: US 11,960,361 B2
(45) Date of Patent: *Apr. 16, 2024

(54) VERIFYING AND MIGRATING DATA SLICES IN A STORAGE NETWORK

(71) Applicant: Pure Storage, Inc., Mountain View, CA (US)

(72) Inventors: Ahmad Alnafoosi, Streamwood, IL (US); Andrew D. Baptist, Mt. Pleasant, WI (US); Greg R. Dhuse, Chicago, IL (US); Jason K. Resch, Warwick, RI (US); Ilya Volvovski, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,604

(22) Filed: Oct. 21, 2022

(65) Prior Publication Data

US 2023/0054773 A1    Feb. 23, 2023

Related U.S. Application Data

(63) Continuation of application No. 17/408,872, filed on Aug. 23, 2021, now Pat. No. 11,507,459, which is a (Continued)

(51) Int. Cl.
*G06F 11/10*    (2006.01)
*G06F 3/06*    (2006.01)
(Continued)

(52) U.S. Cl.
CPC ........ *G06F 11/1092* (2013.01); *G06F 3/0619* (2013.01); *G06F 3/064* (2013.01);
(Continued)

(58) Field of Classification Search
CPC .... G06F 3/0619; G06F 12/0223; G06F 3/067; G06F 3/0647; G06F 3/0679;
(Continued)

(56) References Cited

U.S. PATENT DOCUMENTS 4,092,732 A    5/1978    Ouchi
5,454,101 A    9/1995    Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Kyung H Shin
(74) *Attorney, Agent, or Firm* — Garlick & Markison; Timothy W. Markison; Kelly H. Hale

(57) ABSTRACT

A method for execution by a storage network includes receiving a request pertaining to a data object. Metadata associated with the data object is determined and used to identify data segments associated with the data object and a set of storage units associated with the data segments. Based on a set of query requests, a response is received from a storage unit from the set of storage units. When the response indicates a storage environment that is unfavorable as compared to predetermined performance metrics, the storage network facilitates migration of encoded data slices associated with the storage unit to another storage unit.

20 Claims, 7 Drawing Sheets

Related U.S. Application Data continuation of application No. 17/078,345, filed on Oct. 23, 2020, now Pat. No. 11,113,009, which is a continuation of application No. 16/693,742, filed on Nov. 25, 2019, now Pat. No. 10,831,544, which is a continuation of application No. 16/143,854, filed on Sep. 27, 2018, now Pat. No. 10,521,300, which is a continuation of application No. 15/719,259, filed on Sep. 28, 2017, now Pat. No. 10,127,111, which is a continuation-in-part of application No. 15/427,934, filed on Feb. 8, 2017, now Pat. No. 9,813,501, which is a continuation of application No. 13/959,006, filed on Aug. 5, 2013, now Pat. No. 9,648,087.

(60) Provisional application No. 61/711,106, filed on Oct. 8, 2012.

(51) Int. Cl.
| | |
|---|---|
| *G06F 9/50* | (2006.01) |
| *G06F 16/215* | (2019.01) |
| *G06F 21/64* | (2013.01) |
| *H04L 43/0852* | (2022.01) |
| *H04L 47/70* | (2022.01) |
| *H04L 67/10* | (2022.01) |
| *H04L 67/1097* | (2022.01) |
| *H04L 67/61* | (2022.01) |
| *H04L 9/40* | (2022.01) |

(52) U.S. Cl.
CPC ............ *G06F 3/0659* (2013.01); *G06F 3/067* (2013.01); *G06F 9/5027* (2013.01); *G06F 11/1076* (2013.01); *G06F 11/108* (2013.01); *G06F 16/215* (2019.01); *G06F 21/64* (2013.01); *H04L 43/0852* (2013.01); *H04L 47/70* (2013.01); *H04L 67/10* (2013.01); *H04L 67/1097* (2013.01); *H04L 67/61* (2022.05); *H04L 63/08* (2013.01); *H04L 63/101* (2013.01)

(58) Field of Classification Search
CPC ........ G06F 16/215; G06F 21/80; G06F 21/64; G06F 11/1402; G06F 11/1088; G06F 11/1092; G06F 3/0665; G06F 3/065; G06F 3/0689; G06F 11/0727; G06F 3/068; G06F 11/1076; G06F 3/0685; G06F 11/1096; G06F 3/0614; G06F 3/0631; H04L 9/085; H04L 67/02; H04L 67/1097; H04N 7/17336; H04N 21/8456; H04N 21/4331; H04N 21/64322; H04N 21/632
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0088976 A1 | 4/2005 | Chafle | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters, III | |
| 2009/0094251 A1 | 4/2009 | Gladwin | |
| 2009/0094318 A1 | 4/2009 | Gladwin | |
| 2010/0023524 A1 | 1/2010 | Gladwin | |
| 2010/0268966 A1 | 10/2010 | Leggette et al. | |
| 2010/0287200 A1* | 11/2010 | Dhuse ................ | H04N 7/17336 714/763 |
| 2011/0072210 A1 | 3/2011 | Dhuse | |
| 2011/0072321 A1 | 3/2011 | Dhuse | |
| 2011/0078774 A1 | 3/2011 | Grube | |
| 2011/0106904 A1 | 5/2011 | Resch | |
| 2011/0126295 A1* | 5/2011 | Resch ................... | G06F 16/215 726/27 |
| 2011/0214011 A1* | 9/2011 | Grube ................ | G06F 11/1092 714/E11.062 |
| 2011/0265143 A1 | 10/2011 | Grube et al. | |
| 2011/0314346 A1 | 12/2011 | Vas | |

(56) References Cited

U.S. PATENT DOCUMENTS

2012/0054581 A1* 3/2012 Grube ................ G06F 3/0619
714/769
2013/0179894 A1 7/2013 Calder

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: an Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): the Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner

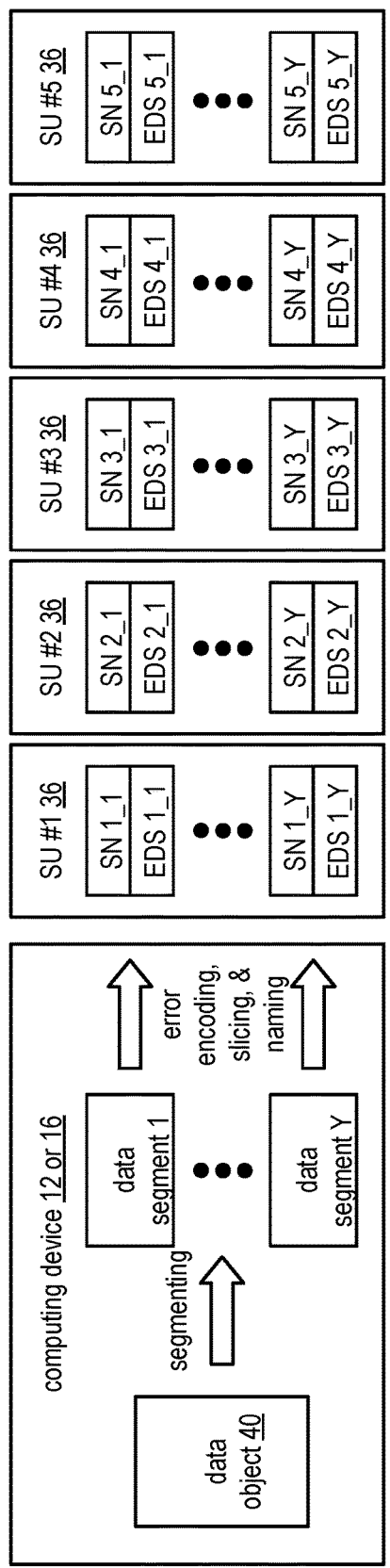
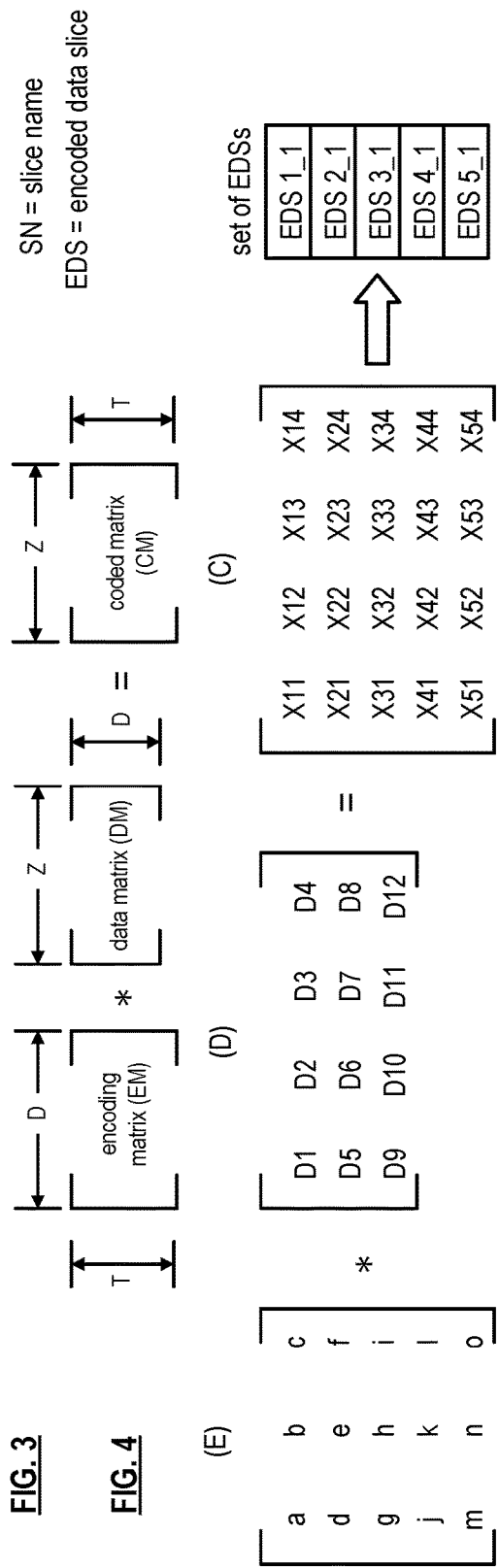
FIG. 3
FIG. 4
FIG. 5
FIG. 6

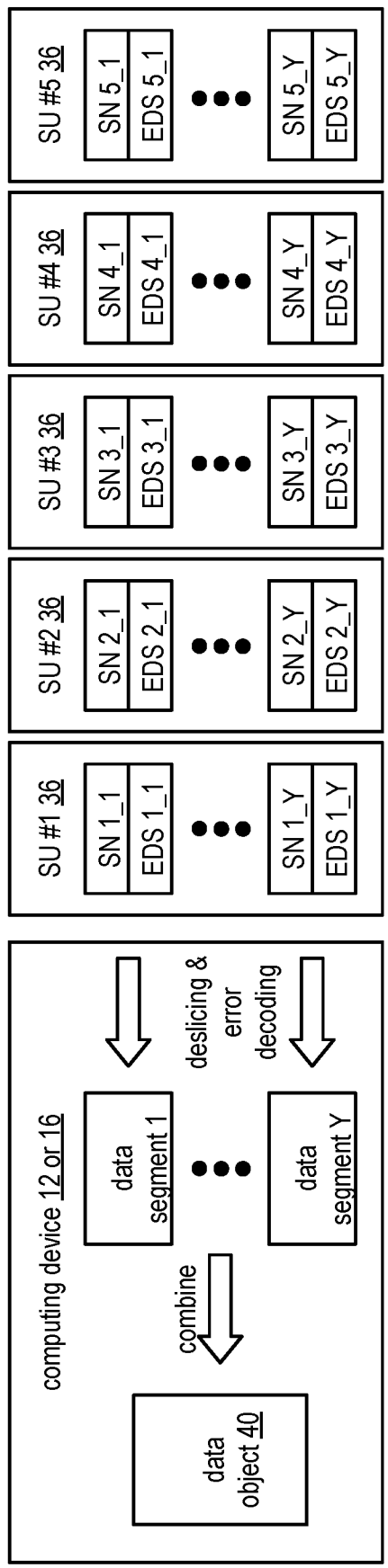

VERIFYING AND MIGRATING DATA SLICES IN A STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 17/408,872, entitled "MIGRATION OF DATA IN A DISTRIBUTED STORAGE NETWORK USING STORAGE RECORDS," filed 08-23-2021, which is a continuation of U.S. Utility patent application Ser. No. 17/078,345, entitled "COMPUTING DEVICE FACILITATING PRIORITIZATION OF TASK EXECUTION WITHIN A DISTRIBUTED STORAGE NETWORK," filed Oct. 23, 2020, issued as U.S. Pat. No. 11,113,009 on Sep. 7, 2021, which is a continuation of U.S. Utility patent application Ser. No. 16/693,742, entitled "PRIORITIZATION TASK EXECUTION WITHIN A STORAGE UNIT (SU)," filed Nov. 25, 2019, issued as U.S. Pat. No. 10,831,544 on Nov. 10, 2020, which is a continuation of U.S. Utility patent application Ser. No. 16/143,854, entitled "CLIENT PROVIDED REQUEST PRIORITIZATION HINTS," filed Sep. 27, 2018, issued as U.S. Pat. No. 10,521,300 on Dec. 31, 2019, which is a continuation of U.S. Utility patent application Ser. No. 15/719,259, entitled "CLIENT PROVIDED REQUEST PRIORITIZATION HINTS," filed Sep. 28, 2017, issued as U.S. Pat. No. 10,127,111 on Nov. 13, 2018, which claims priority pursuant to 35 U.S.C. § 120 as a continuation-in-part (CIP) of U.S. Utility patent application Ser. No. 15/427,934, entitled "ALLOCATING DISTRIBUTED STORAGE AND TASK EXECUTION RESOURCES," filed Feb. 8, 2017, issued as U.S. Pat. No. 9,813,501 on Nov. 7, 2017, which claims priority pursuant to 35 U.S.C. § 120 as a continuation of U.S. Utility application Ser. No. 13/959,006, entitled "ALLOCATING DISTRIBUTED STORAGE AND TASK EXECUTION RESOURCES," filed Aug. 5, 2013, issued as U.S. Pat. No. 9,648,087 on May 9, 2017, which claims priority pursuant to 35 U.S.C. § 119(e) to U.S. Provisional Application No. 61/711,106, entitled "PRIORITIZING TASKS IN A DISTRIBUTED STORAGE AND TASK NETWORK," filed Oct. 8, 2012, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data;

FIG. 4 is a schematic block diagram of a generic example of an error encoding function;

FIG. 5 is a schematic block diagram of a specific example of an error encoding function;

FIG. 6 is a schematic block diagram of an example of a slice name of an encoded data slice (EDS);

FIG. 7 is a schematic block diagram of an example of dispersed storage error decoding of data;

FIG. 8 is a schematic block diagram of a generic example of an error decoding function;

DETAILED DESCRIPTION OF THE INVENTION

Figure 1:
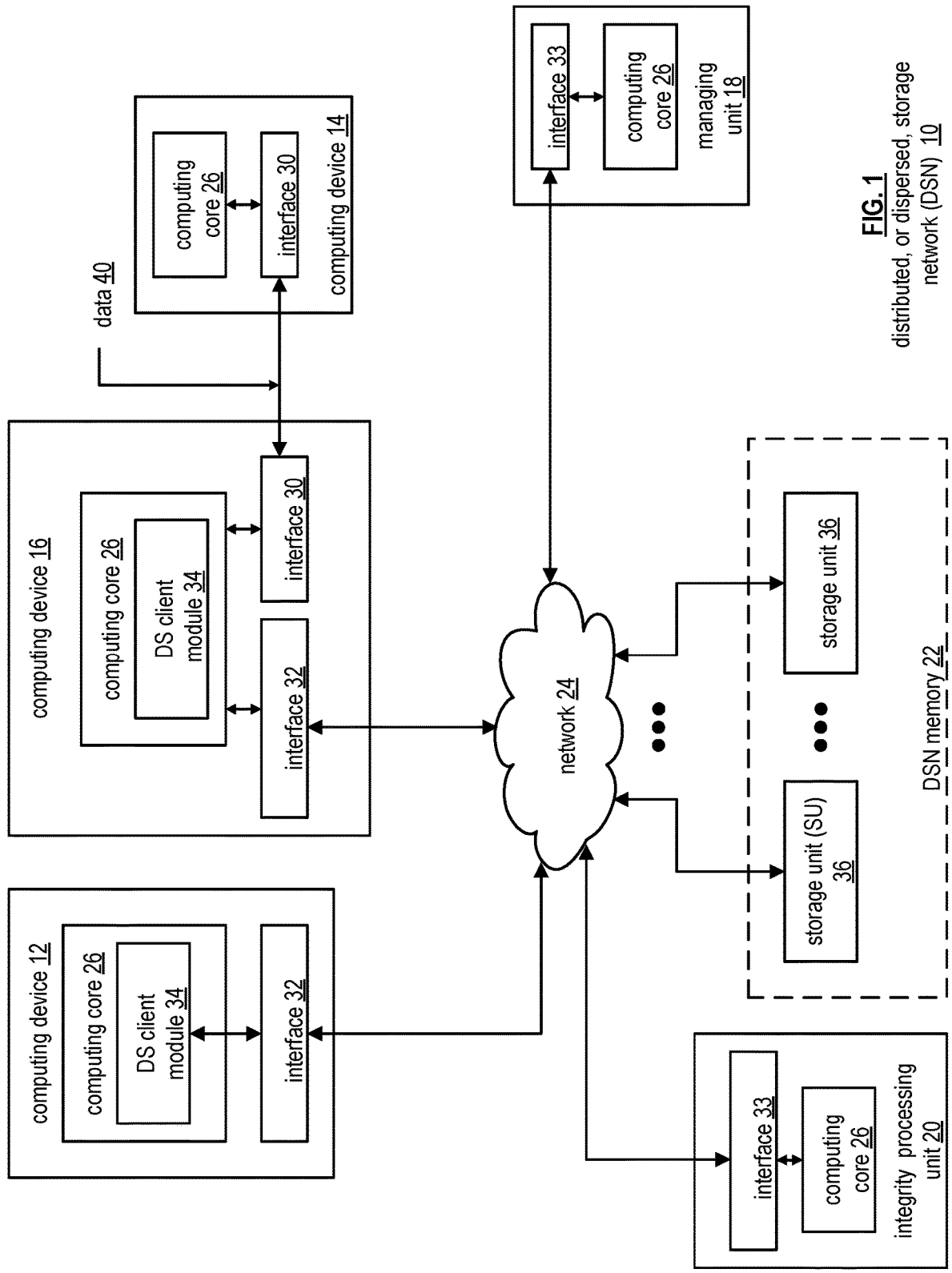
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
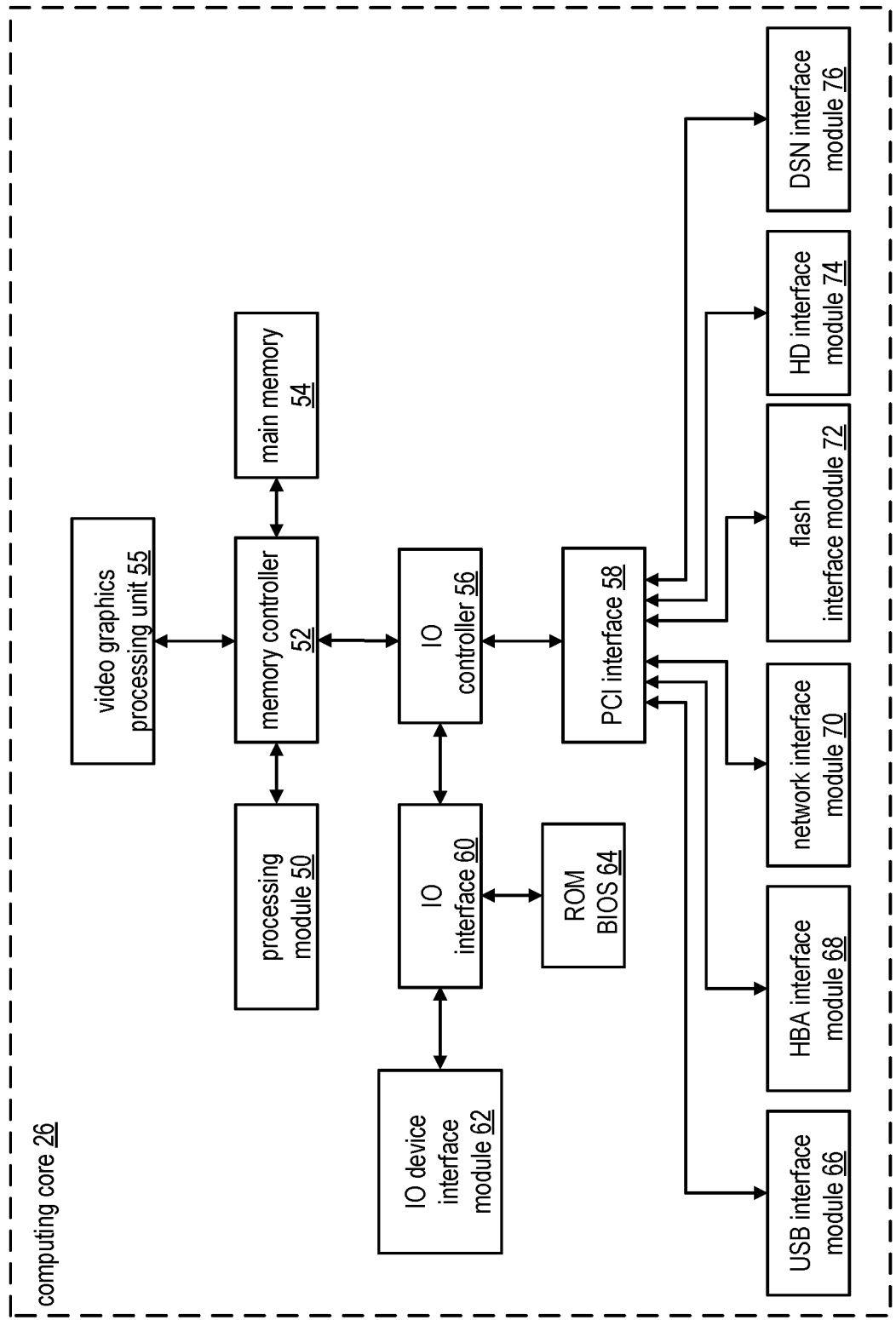
FIG. 2 is a schematic block diagram of an embodiment of a computing core.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilobytes to Terabytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
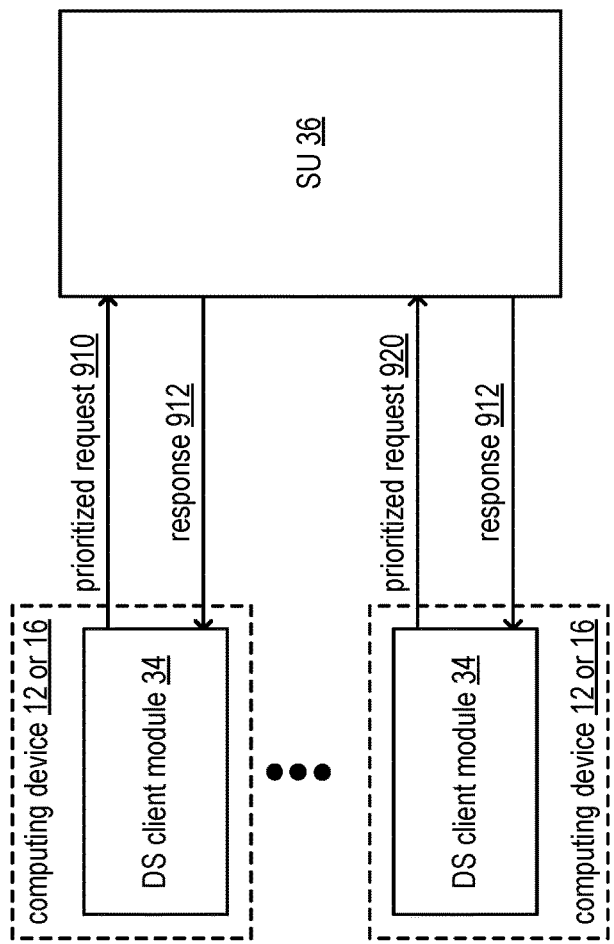
FIG. 9 is a schematic block diagram of another embodiment of a distributed computing system.

FIG. 9 is a schematic block diagram of another embodiment of a distributed computing system in accordance with the present invention. This diagram includes a schematic block diagram of another embodiment of a distributed computing system that includes a plurality of distributed storage (DS) client modules 34 and storage unit (SU) 36. Each DS client module 34 of the plurality of DS client module 34 may be implemented in at least one of the user device and a computing device. The system functions to prioritize access requests from the plurality of DS client modules 34. The access request may include a dispersed or distributed storage network (DSN). The DSN access request may include at least one of a read request, a write request, a delete request, a list request, etc. An access request is executed in accordance with a prioritization scheme and a response is generated based on a result of executing the request.

The DS client module 34 generates a prioritized request and sends the prioritized request of the SU 36. The prioritized request includes one or more of a task for execution and a desired priority level. The DS client module 34 selects a value of the desired priority level based on one or more of a previous response corresponding to the request, a request type of the request, the timing requirement, a priority input, and the data type associated with the request.

The SU 36 determines an execution priority level for the prioritized requests based on one or more of a current loading level, execution priority levels of previously queued requests, and the desired priority level of the prioritized request. The execution priority level indicates a priority value level relative to other execution priority levels of other prioritized requests. For example, a rejection level indicates that the prioritized request will not be executed. As another example, a process level indicates that the prioritized request will be executed in accordance with other queued prioritized requests. The SU 36 generates and outputs a response to the DS client module 34. The response includes the determined execution priority level. Next, the SU 36 executes tasks associated with the queued prioritized requests in accordance with determined execution priority levels. The SU 36 may generate a subsequent response that includes a result of the execution of the tasks associated with at least one of the queued prioritized requests. For example, the SU 36 generates a response that includes an encoded data slice when the prioritized request includes a request to read the encoded data slice.

Note that the DS client modules 34 may be implemented within various instantiations of the computing device 12 or 16 as described herein or their equivalents. For example, in some implementations, such a computing device includes an interface configured to interface and communicate with a dispersed or distributed storage network (DSN), memory that stores operational instructions. And a processing module operably coupled to the interface and to the memory. The processing module, when operable within the computing device based on the operational instructions, is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device is configured to generate a prioritized request that includes a task for execution and/or a priority level based on information stored within a storage unit (SU) of a plurality of storage units (SUs) implemented within a DSN. For example, the information may correspond to a data object is segmented into a plurality of data segments. A data segment of the plurality of data segments is dispersed error encoded in accordance with dispersed error encoding parameters to produce a set of encoded data slices (EDSs), and the set of EDSs are distributedly stored among a plurality of SUs. Note that a decode threshold number of EDSs are needed to recover the data segment. The computing device is also configured to transmit the prioritized request to the SU. Then, the computing device is configured to receive, from the SU, a response to the prioritized request. The response is based on an execution priority level that indicates a priority value level relative to other execution priority levels of other prioritized requests when the SU determines to execute the prioritized request.

In addition, in some examples, the response includes a rejection level when the SU determines not to execute the prioritized request. In such instances, the computing device may be further configured to re-transmit the prioritized request to the SU. Alternatively, the computing device may be further configured to generate another prioritized request that includes another priority level based on information stored within the SU of the plurality of SUs implemented within the DSN and transmit the other prioritized request to the SU.

In certain examples, the priority level is based on a previous response corresponding to the prioritized request, a request type of the prioritized request, a timing requirement associated of the prioritized request, a priority input prioritized request, and/or a data type associated with the prioritized request Also, in some implementations, the execution priority level is determined by the SU and is based on a current loading level of the SU, at least one execution priority level of at least one previously queued prioritized request, and/or a priority level of the prioritized request.

In a particular implementation, the computing device is also configured to receive, from the SU when the SU determines to execute the prioritized request, a subsequent response that includes a result of execution of the prioritized request as generated by the SU.

In another example of operation and implementation, the computing device is configured to generate a prioritized request that includes a task for execution and/or a priority level based on information stored within a SU of the plurality of SUs implemented within the DSN. The computing device is configured to transmit the prioritized request to the SU.

When the SU determines to execute the prioritized request, the computing device is configured to receive, from the SU, a response to the prioritized request. Such a response is based on an execution priority level that indicates a priority value level relative to other execution priority levels of other prioritized requests. Also, the computing device is configured to receive, from the SU, a subsequent response that includes a result of execution of the prioritized request as generated by the SU.

Alternatively, when the SU determines not to execute the prioritized request, the computing device is configured to receive, from the SU, another response to the prioritized request that includes a rejection level. the computing device is also configured to re-transmit the prioritized request to the SU. Alternatively, the computing device is configured to generate another prioritized request that includes another priority level based on information stored within the SU of the plurality of SUs implemented within the DSN and transmit the other prioritized request to the SU.

In some examples, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some examples, the write threshold number is greater than or equal to the read threshold number that is greater than or equal to the decode threshold number.

The computing device may be implemented as any of a number of different devices including a managing unit that is remotely located from the other computing device within the DSN and also remotely located from at least one SU of the plurality of SUs within the DSN. In other examples, the computing device may be implemented as a SU of the plurality of SUs within the DSN, a wireless smart phone, a laptop, a tablet, a personal computers (PC), a work station, or a video game device. Also, the DSN may be implemented to include or be based on any of a number of different types of communication systems including a wireless communication system, a wire lined communication system, a non-public intranet system, a public internet system, a local area network (LAN), and/or a wide area network (WAN).

Also, note that the computing device may be located at a premises that is remotely located from at least one SU of a plurality of SUs within the DSN. Also, note that the computing device may be of any of a variety of types of devices as described herein and/or their equivalents.

Figure 10A:
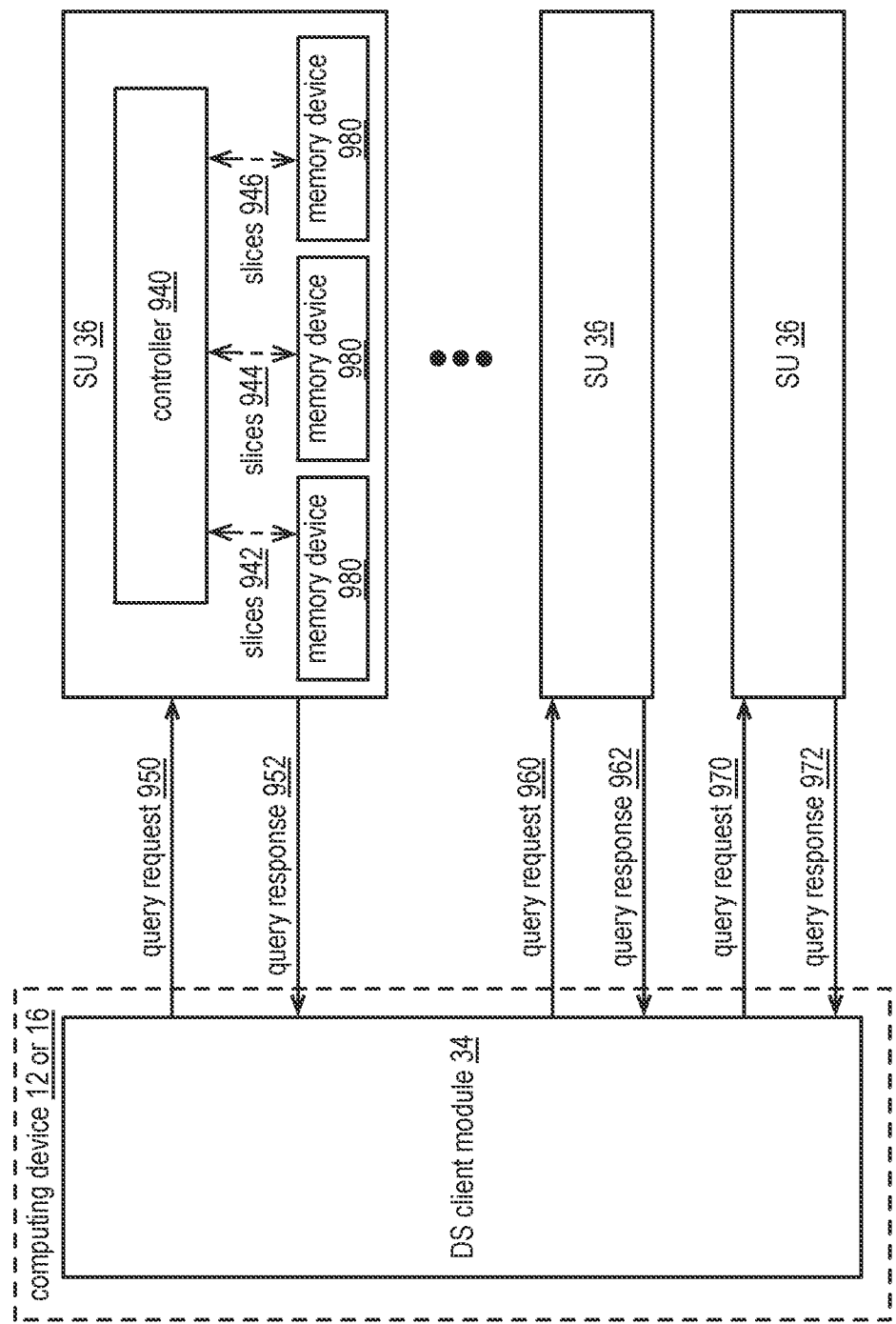
FIG. 10A is a schematic block diagram of another embodiment of a distributed computing system.

FIG. 10A is a schematic block diagram of another embodiment of a distributed computing system that includes a distributed storage and task (DST) client module 34 and a plurality of DST execution units (storage units) 36. Each DST execution unit 36 of the plurality of DST execution units 36 includes a controller 940 and a plurality of memory devices 980. The plurality of memory devices 980 function to store encoded data slices. The system functions to verify utilization of storage capacity of the plurality of DST execution units 36 with regards to storage of encoded data slices.

The DST client module 34 identifies a file for storage analysis. The identifying may be based on one or more of receiving a request, a predetermination, a list, utilizing a round robin approach, identifying the file as a next file on a file list. The DST client module 34 generates a plurality of sets of slice names corresponding to a plurality of sets of encoded data slices stored in the plurality of DST execution units 36. The file is segmented to produce a plurality of segments. Each segment of the plurality of segments is encoded utilizing a dispersed storage error coding function to produce a set of encoded data slices. The generating of the plurality of sets of slice names may be based on one or more of a file identifier (ID) of the file, a vault ID corresponding to the file ID, and a registry lookup.

The DST client module 34 identifies a set of DST execution units 36 of the plurality of DST execution units 36 associated with storage of the plurality of sets of encoded data slices. The identifying may be based on one or more of receiving identifiers of the set of DST execution units 36, a registry lookup, and a distributed storage and task network (DSTN) virtual address to physical location table lookup.

For each DST execution unit 36 of the set of DST execution units 36, the DST client module 34 generates a plurality of query requests 950-970 corresponding to the plurality of sets of encoded data slices. Each query request of the plurality of query requests includes a slice name corresponding to an encoded data slice of a set of encoded data slices stored in a memory device of the plurality of memory devices of the DST execution unit 36. The DST client module 34 outputs the query request to the DST execution unit 36.

A corresponding controller of the DST execution unit 36 receives the query request and identifies the memory device 980 of the plurality of memory devices that is utilized to store the encoded data slice. The DST execution unit 36 generates a query response. The query response includes one or more of the slice name, storage location information which includes an identifier of the memory device, a length of time of storage indicator, a memory device age, and a memory device replacement schedule. The generating includes at least one of accessing a local table and retrieving information from the memory device. The DST execution unit 36 outputs the query response to the DST client module 34

For the set of encoded data slices, the DST client module 34 receives a set of query responses 952-972 from the set of DST execution units 36. The DST client module 34 facilitates a storage action based on the set of query responses. A first storage action includes generating a storage record that includes one or more of the file ID, a source name corresponding to the file ID, identity of the plurality of data segments, the plurality of sets of slice names, identity of the set of DST execution units 36, and the storage location information within each DST execution unit 36 of the set of DST execution units 36. A second storage action includes migrating at least some encoded data slices of the plurality of sets of encoded data slices when the storage record compares unfavorably to a desired storage record. For example, the DST client module 34 detects an imbalance based on the comparison and indicates to migrate the at least some encoded data slices. The method to verify storage utilization is discussed in greater detail with reference to FIG. 10B.

Figure 10B:
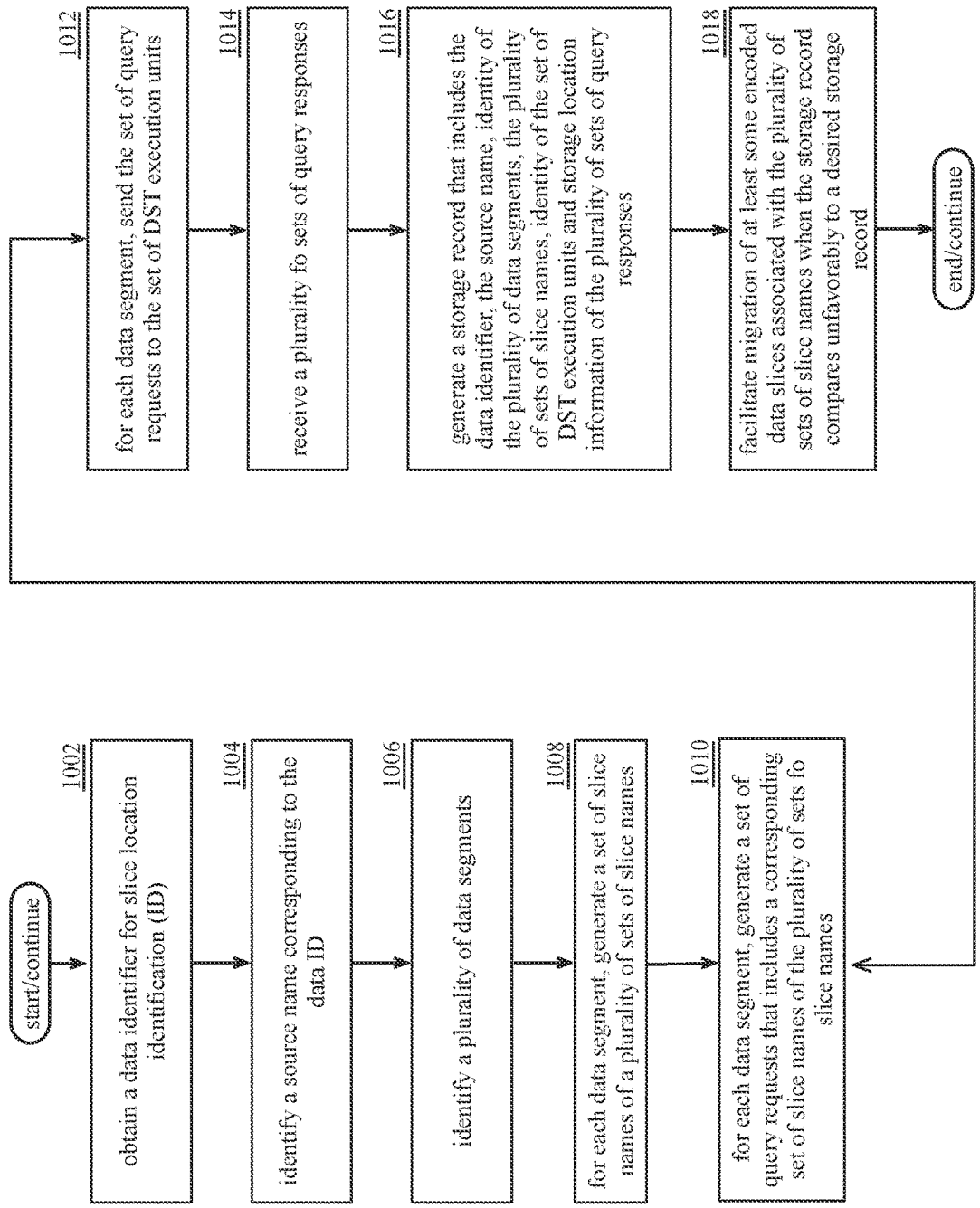
FIG. 10B is a flowchart illustrating an example of verifying storage utilization.

FIG. 10B is a flowchart illustrating an example of verifying storage utilization. The method begins with step 1002 where a processing module (e.g., of a distributed storage and task (DST) client module) obtains a data identifier (ID) for slice location identification. The obtaining includes at least one of receiving, initiating a query, extracting from an error message, and receiving a user request. The method continues at step 1004 where the processing module identifies a source name (e.g., a virtual distributed storage and task network (DSTN) address) corresponding to the data ID. The identifying may be based on a directory lookup utilizing the data ID to extract the source name from a DSTN directory. The method continues at step 1006 where the processing module identifies a plurality of data segments. The identifying includes at least one of extracting identities from a segment allocation table associated with the source name and extracting from a first retrieved data segment associated with the source name.

For each data segment of the plurality of data segments, the method continues at step 1008 where the processing module generates a set of slice names of a plurality of sets of slice names. Each slice name of the set of slice names includes the source name and a segment number in accordance with the plurality of data segments. The method continues at step 1008 where the processing module identifies a set of DST execution units based on the plurality of sets of slice names. The identifying includes accessing a slice name to physical location table utilizing the set of slice names.

For each data segment of the plurality of data segments, the method continues at step 1010 where the processing module generates a set of query requests that includes a corresponding set of slice names of the plurality of sets of slice names. For each data segment, the method continues at step 1012 where the processing module sends the set of query requests to the set of DST execution units. The method continues at step 1014 where the processing module receives a plurality of sets of query requests. The method continues at step 1016, where the processing module generates a storage record that includes the data identifier, the source name, identity of the plurality of data segments, the plurality of sets of slice names, identity of the set of DST execution units, and storage location information of the plurality of sets of query responses. Alternatively, or in addition to, the processing module may graphically display information of the storage record.

The method continues at step 1018 where the processing module facilitates migration of at least some encoded data slices associated with the plurality sets of slice names when the storage record compares unfavorably to a desired storage record. The facilitating includes identifying the at least some encoded data slices based on the comparison. For example, a processing module identifies the at least some encoded data slices to migrate when a memory device identifier of the storage location information is associated with an unfavorable reliability level. It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution in a storage network, the method comprising:
   receiving a request pertaining to a data object, wherein the data object is segmented into a plurality of data segments, wherein a data segment of the plurality of data segments is dispersed error encoded in accordance with dispersed error encoding parameters to produce a set of encoded data slices;
   determining metadata associated with the data object;
   based on the metadata, identifying one or more data segments associated with the data object;
   determining a set of storage units associated with each of the one or more data segments;
   sending a set of query requests to the set of units;
   receiving, based on the set of query requests, a response from a storage unit of the set of storage units;
   generating, based on the response, a storage record, wherein the storage record includes a data identifier associated with the data object and an identity of the set of storage units;
   determining whether the response indicates an unfavorable storage environment,
   wherein an unfavorable storage environment is a storage environment comprising a storage record that compares unfavorably to a desired storage record; and
   when the storage record compares unfavorably to a desired storage record, facilitating migration of one or more encoded data slices associated with the storage unit to another storage unit.

2. The method of claim 1, further comprising:
   generating the set of query requests for a data segment of the one or more data segments; and
   sending the set of query requests to the set of storage units associated with the data segment.

3. The method of claim 1, wherein the metadata includes a data identifier for slice location.

4. The method of claim 1, wherein the metadata is determined based on at least one of receiving the metadata via the storage network, initiating a query, extracting the metadata from an error message, and receiving a user request.

5. The method of claim 1, wherein the set of storage units associated with each of the one or more data segments is determined based on a list adapted to map metadata to physical storage locations.

6. The method of claim 1, further comprising:
generating a set of slice identifiers for each of the one or more data segments.

7. The method of claim 6, wherein a slice identifier includes information sufficient to determine a physical storage location for a slice.

8. The method of claim 7, wherein the physical storage location is determined based on a list adapted to map the slice identifier to a physical storage location.

9. The method of claim 1, further comprising:
generating a storage record for the one or more encoded data slices.

10. The method of claim 9, wherein information pertaining to the storage record is graphically displayed on a display device associated with a user.

11. A processing system of a storage network client module comprises:
at least one processor;
a memory that stores operational instructions, that when executed by the at least one processor cause the processing system to perform operations including:
receiving a request pertaining to a data object, wherein the data object is segmented into a plurality of data segments, wherein a data segment of the plurality of data segments is dispersed error encoded in accordance with dispersed error encoding parameters to produce a set of encoded data slices;
determining metadata associated with the data object;
based on the metadata, identifying one or more data segments associated with the data object;
determining a set of storage units associated with each of the one or more data segments;
sending a set of query requests to the set of storage units;
receiving, based on the set of query requests, a response from a storage unit of the set of storage units;
generating, based on the response, a storage record, wherein the storage record includes a data identifier associated with the data object and an identity of the set of storage units;
determining whether the response indicates an unfavorable storage environment, wherein an unfavorable storage environment is a storage environment comprising a storage record that compares unfavorably to a desired storage record; and
when an unfavorable storage environment is indicated, facilitating migration of one or more encoded data slices associated with the storage unit to another storage unit.

12. The processing system of claim 11, further comprising:
generating the set of query requests for a data segment of the one or more data segments; and
sending the set of query requests to the set of storage units associated with the data segment.

13. The processing system of claim 11, wherein the metadata includes a data identifier for slice location.

14. The processing system of claim 11, wherein the metadata is determined based on at least one of receiving the metadata via the storage network, initiating a query, extracting the metadata from an error message, and receiving a user request.

15. The processing system of claim 11, wherein the set of storage units associated with each of the one or more data segments is determined based on a list adapted to map metadata to physical storage locations.

16. The processing system of claim 11, further comprising:
generating a set of slice identifiers for each of the one or more data segments.

17. The processing system of claim 16, wherein a slice identifier includes information sufficient to determine a physical storage location for a slice.

18. The processing system of claim 17, wherein the physical storage location is determined based on a list adapted to map the slice identifier to a physical storage location.

19. The processing system of claim 11, further comprising:
generating a storage record for the one or more encoded data slices.

20. A computer readable storage medium comprises:
at least one memory section that stores operational instructions that, when executed by a processing system of a storage network that includes a processor and a memory, causes the processing system to:
receive a request pertaining to a data object, wherein the data object is segmented into a plurality of data segments, wherein a data segment of the plurality of data segments is dispersed error encoded in accordance with dispersed error encoding parameters to produce a set of encoded data slices;
determine metadata associated with the data object;
based on the metadata, identify one or more data segments associated with the data object;
determine a set of storage units associated with each of the one or more data segments;
sending a set of query requests to the set of storage units;
receiving, based on the set of query requests, receiving a response from a storage unit of the set of storage units;
generating, based on the response, a storage record, wherein the storage record includes a data identifier associated with the data object and an identity of the set of storage units;
determine whether the response indicates an unfavorable storage environment, wherein an unfavorable storage environment is a storage environment comprising a storage record that compares unfavorably to a desired storage record; and
when the storage record compares unfavorably to a desired storage record, facilitate migration of one or more encoded data slices associated with the storage unit to another storage unit.

* * * * *